US010237648B2

(12) United States Patent
Takada et al.

(10) Patent No.: US 10,237,648 B2
(45) Date of Patent: Mar. 19, 2019

(54) SOUND COLLECTING DEVICE, AND METHOD OF CONTROLLING SOUND COLLECTING DEVICE

(71) Applicant: CLARION CO., LTD., Saitama (JP)

(72) Inventors: Naoki Takada, Saitama (JP); Fumiaki Nakashima, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 15/574,008

(22) PCT Filed: Jun. 1, 2016

(86) PCT No.: PCT/JP2016/066181
§ 371 (c)(1),
(2) Date: Nov. 14, 2017

(87) PCT Pub. No.: WO2016/194945
PCT Pub. Date: Dec. 8, 2016

(65) Prior Publication Data
US 2018/0295443 A1 Oct. 11, 2018

(30) Foreign Application Priority Data
Jun. 1, 2015 (JP) .................. 2015-111657

(51) Int. Cl.
H04R 3/00 (2006.01)
B60N 2/80 (2018.01)
(Continued)

(52) U.S. Cl.
CPC ............. H04R 3/005 (2013.01); A47C 7/38 (2013.01); A47C 7/62 (2013.01); B60N 2/80 (2018.02);
(Continued)

(58) Field of Classification Search
CPC ..... G10L 21/0232; H04R 1/025; H04R 1/406; B60N 2/90; B60N 2/80; A47C 7/38; A47C 7/72; B60R 11/02
(Continued)

(56) References Cited

U.S. PATENT DOCUMENTS

2005/0278093 A1 12/2005 Kameyama
2010/0041443 A1* 2/2010 Yokota ................ H04M 1/6083
455/569.2
(Continued)

FOREIGN PATENT DOCUMENTS

JP 2003111200 A 4/2003
JP 2005-352732 A 12/2005
(Continued)

OTHER PUBLICATIONS

International Preliminary Report on Patentability issued for corresponding PCT/JP2016/066181.
(Continued)

Primary Examiner — William A Jerez Lora
(74) Attorney, Agent, or Firm — IP Business Solutions, LLC

(57) ABSTRACT

An object is to provide a sound collecting device and a method of controlling a sound collecting device with which it is possible to easily obtain audio of a speaking person with a high level of precision while keeping the number of component parts small and preventing the structure from becoming complicated.
An audio processing unit 35 judges whether or not the current mode is an operation mode (a speech mode or a conversation mode) in which audio of an occupant of the vehicle serving as a speaking person is obtained (step S1A). When the current mode is another operation mode (an audio playback mode or a head position measuring mode), the
(Continued)

audio processing unit 35 sets the directionality of a microphone array to be directed toward the outside of the occupant or to be non-directional (steps S4A and S5A) and obtains input audio of the microphone array. In contrast, when the current mode is an operation mode (the speech mode or the conversation mode) in which audio of the occupant is obtained, the audio processing unit 35 arranges the directionality of the microphone array to be directed toward the occupant (step S2A).

12 Claims, 10 Drawing Sheets

(51) Int. Cl.

| | | |
|---|---|---|
| *A47C 7/38* | (2006.01) | |
| *A47C 7/62* | (2006.01) | |
| *B60R 11/02* | (2006.01) | |
| *G10L 21/0232* | (2013.01) | |
| *H04R 1/02* | (2006.01) | |
| *H04R 1/40* | (2006.01) | |
| *B60N 2/90* | (2018.01) | |
| *A47C 7/72* | (2006.01) | |
| *H04S 7/00* | (2006.01) | |

(52) U.S. Cl.
CPC .......... *B60R 11/02* (2013.01); *G10L 21/0232* (2013.01); *H04R 1/025* (2013.01); *A47C 7/72* (2013.01); *B60N 2/90* (2018.02); *H04R 1/02* (2013.01); *H04R 1/40* (2013.01); *H04R 1/406* (2013.01); *H04R 2499/13* (2013.01); *H04S 7/303* (2013.01)

(58) Field of Classification Search
USPC ...... 381/56, 58, 71.1, 71.4, 71.8, 86, 91, 92, 381/333, 356, 124
See application file for complete search history.

(56) References Cited

U.S. PATENT DOCUMENTS

| | | |
|---|---|---|
| 2010/0208914 A1 | 8/2010 | Ohtsuka |
| 2012/0237049 A1* | 9/2012 | Brown ................. G10K 11/178 381/71.1 |
| 2013/0216064 A1* | 8/2013 | Kim ........................ H04R 3/00 381/86 |
| 2016/0257227 A1 | 9/2016 | Takada et al. |

FOREIGN PATENT DOCUMENTS

| | | |
|---|---|---|
| JP | 2010-45574 A | 2/2010 |
| WO | 2009/157195 A1 | 12/2009 |
| WO | 2015076120 A1 | 5/2015 |

OTHER PUBLICATIONS

Written Opinion of the International Search Authority issued for corresponding PCT/JP2016/066181.
International Search Report issued for corresponding PCT/JP2016/066181 application.
Written Opinion of the International Search Authority issued for corresponding PCT/JP2016/066181 application.
Extended European Search Report issued for corresponding European Patent Application No. 16803379.3-1210/33069520 dated Dec. 5, 2018.

\* cited by examiner

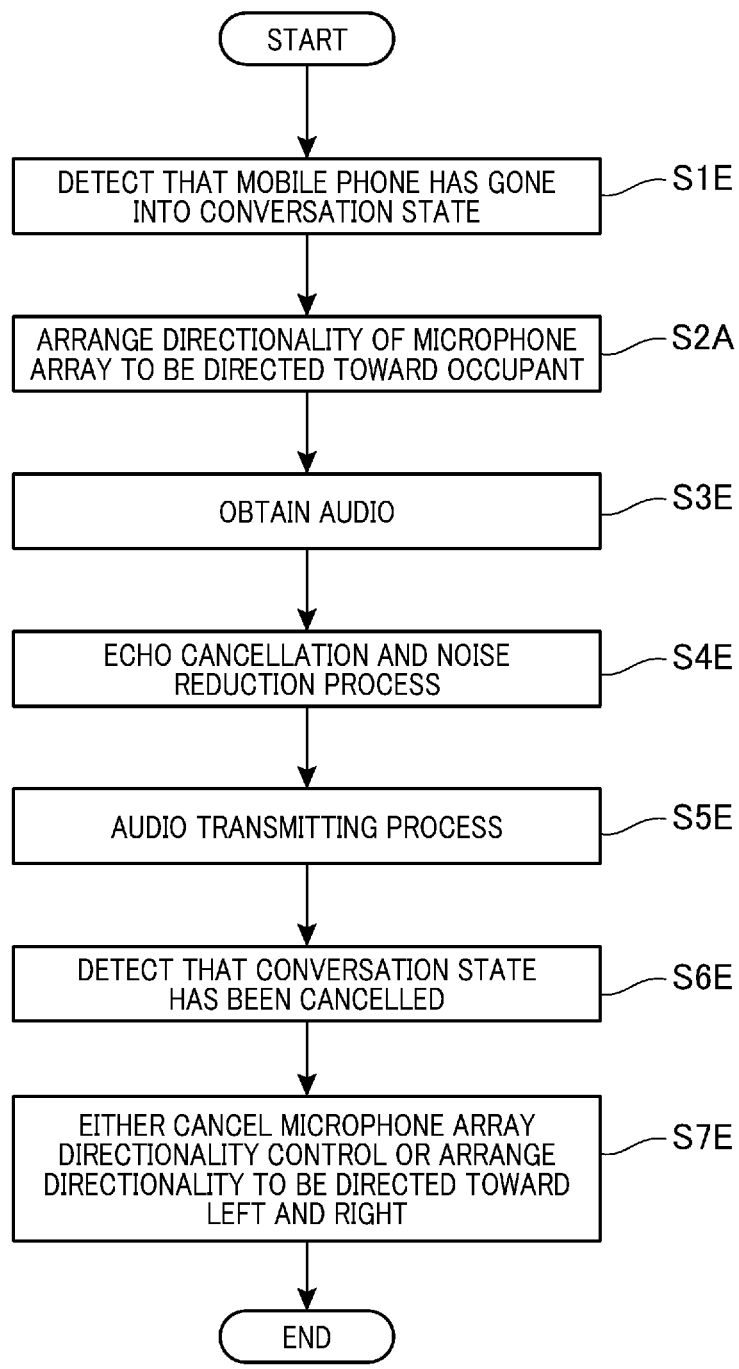

SOUND COLLECTING DEVICE, AND METHOD OF CONTROLLING SOUND COLLECTING DEVICE

TECHNICAL FIELD

The present invention is related to a sound collecting device capable of controlling directionality of a microphone array structured by arranging a plurality of microphones and to a method of controlling the sound collecting device.

BACKGROUND ART

A known in-vehicle device is configured to realize hands-free conversations and voice recognition processes, while a microphone is installed in a dashboard, a ceiling, or a steering wheel of a vehicle. For devices of this type that are configured to collect sound (hereinafter, "sound collecting devices"), it has been proposed, for the purpose of enhancing the capabilities thereof, to provide the devices with a microphone array structured by arranging a plurality of microphones and to control the directionality of the microphone array by exercising beam forming control (see Patent Literature 1, for example).

Patent Literature 1 describes providing a position detector configured to detect the position of the head of a speaking person present in an automobile on the basis of the position of a rear-view mirror or a seat provided for the automobile, so that a directionality arithmetic process is performed on the basis of the detected position of the head and positions of microphones.

CITATION LIST

Patent Literature

Patent Literature 1
International Publication No. WO 2009/157195

SUMMARY OF INVENTION

Technical Problem

The conventional configuration, however, requires the position detector to be configured to physically detect the position of the rear-view mirror or the seat. Accordingly, the configuration is prone to increase the number of component parts and to make the structure complicated.

In view of the circumstances described above, it is an object of the present invention to provide a sound collecting device and a method of controlling the sound collecting device with which it is possible to easily obtain audio of a speaking person with a high level of precision, while keeping the number of component parts small and preventing the structure from becoming complicated.

Solution to Problem

The description of the present application has incorporated herein the entire contents of Japanese Patent Application No. 2015-111657 filed on Jun. 1, 2015.

To achieve the object described above, the present invention provides a sound collecting device capable of controlling directionality of a microphone array structured by arranging a plurality of microphones, including: a judging unit that judges whether or not a current state is a first state in which audio of a speaking person is obtained; and a controlling unit that, when the current state is a second state different from the first state, obtains input audio of the microphone array by setting the directionality of the microphone array to be directed toward an outside of the speaking person or to be non-directional and that, when the current state is the first state, arranges the directionality of the microphone array to be directed toward the speaking person.

The above configuration may be arranged so that the microphone array is positioned behind the speaking person, and when the current state is the first state, the controlling unit sets the directionality of the microphone array to be directed toward an area extending from a back of a head to a neck of the speaking person.

Further, the above configuration may be arranged so that the controlling unit obtains ambient noise on a basis of the input audio obtained in the second state and performs, when the current state is the first state, a noise eliminating process to eliminate the ambient noise from input audio of the microphone array.

Further, the above configuration may be arranged so that the sound collecting device includes an audio output unit that outputs audio via a predetermined speaker, the sound collecting device has, as operation modes, a speech mode in which the audio of the speaking person is obtained and a conversation mode in which audio is output via the speaker, and also, the audio of the speaking person is obtained, and the second state includes a state in which, while in the speech mode or the conversation mode, the audio of the speaking person is not being obtained.

Further, the above configuration may be arranged so that the sound collecting device has, as another one of the operation modes, a position identifying mode in which a reflected sound that is a sound output from the speaker and is reflected by the speaking person is obtained and a position of the speaking person is identified on a basis of the reflected sound, the second state includes a state of being in the position identifying mode, and when the current state is the first state, the directionality of the microphone array is controlled in accordance with the position of the speaking person identified in the position identifying mode.

Further, the above configuration may be arranged so that, when a current mode is an audio output mode in which audio is output via the speaker, the audio output unit performs a position identifying process of outputting an ultrasound wave signal from the speaker, obtaining a reflected sound of the ultrasound wave signal, and identifying a position of the speaking person on the basis of the reflected sound.

Further, the above configuration may be arranged so that the microphone array and the speaker are disposed in a casing positioned behind the speaking person. Further, the above configuration may be arranged so that the casing is a headrest.

Also, the present invention provides a method of controlling a sound collecting device capable of controlling directionality of a microphone array structured by arranging a plurality of microphones, the method including: a step of judging whether or not a current state is a first state in which audio of a speaking person is obtained; and a step of, when the current state is a second state different from the first state, obtaining input audio of the microphone array by setting the directionality of the microphone array to be directed toward an outside of the speaking person or to be non-directional and arranging, when the current state is the first state, the directionality of the microphone array to be directed toward the speaking person.

Advantageous Effects of Invention

According to the present invention, it is judged whether or not the current state is the first state in which the audio of the speaking person is obtained, and when the current state is the second state different from the first state, the input audio of the microphone array is obtained by setting the directionality of the microphone array to be directed toward the outside of the speaking person or to be non-directional. When the current state is the first state, the directionality of the microphone array is directed toward the speaking person. It is therefore possible to obtain the ambient noise and the position information of the speaking person, which are both useful information for audio processing processes during speech, on the basis of the input audio obtained by setting the directionality of the microphone array to be directed toward the outside of the speaking person or to be non-directional. By using the obtained information, it is possible to perform the audio processing processes such as an ambient noise eliminating process or a directionality controlling process during the speech. As a result, a dedicated position detector is not required. Accordingly, it is possible to easily obtain the audio of the speaking person with a high level of precision while keeping the number of component parts small and preventing the structure from becoming complicated.

BRIEF DESCRIPTION OF DRAWINGS

FIG. 10 is a flowchart illustrating control exercised during a conversation mode.

DESCRIPTION OF EMBODIMENTS

Embodiments of the present invention will be explained below, with reference to the drawings.

First Embodiment

Figure 1:
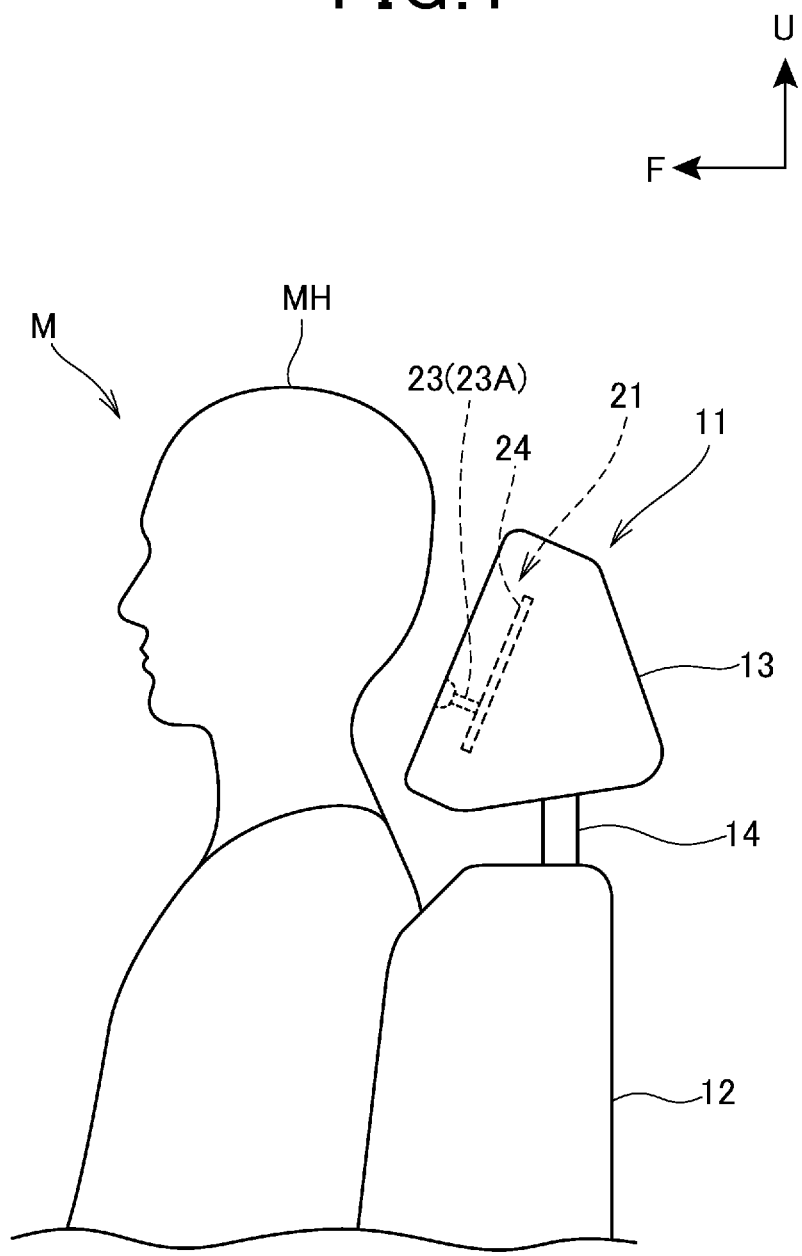
FIG. 1 is a drawing illustrating an example of usage of a headrest device according to a first embodiment.
Figure 2:
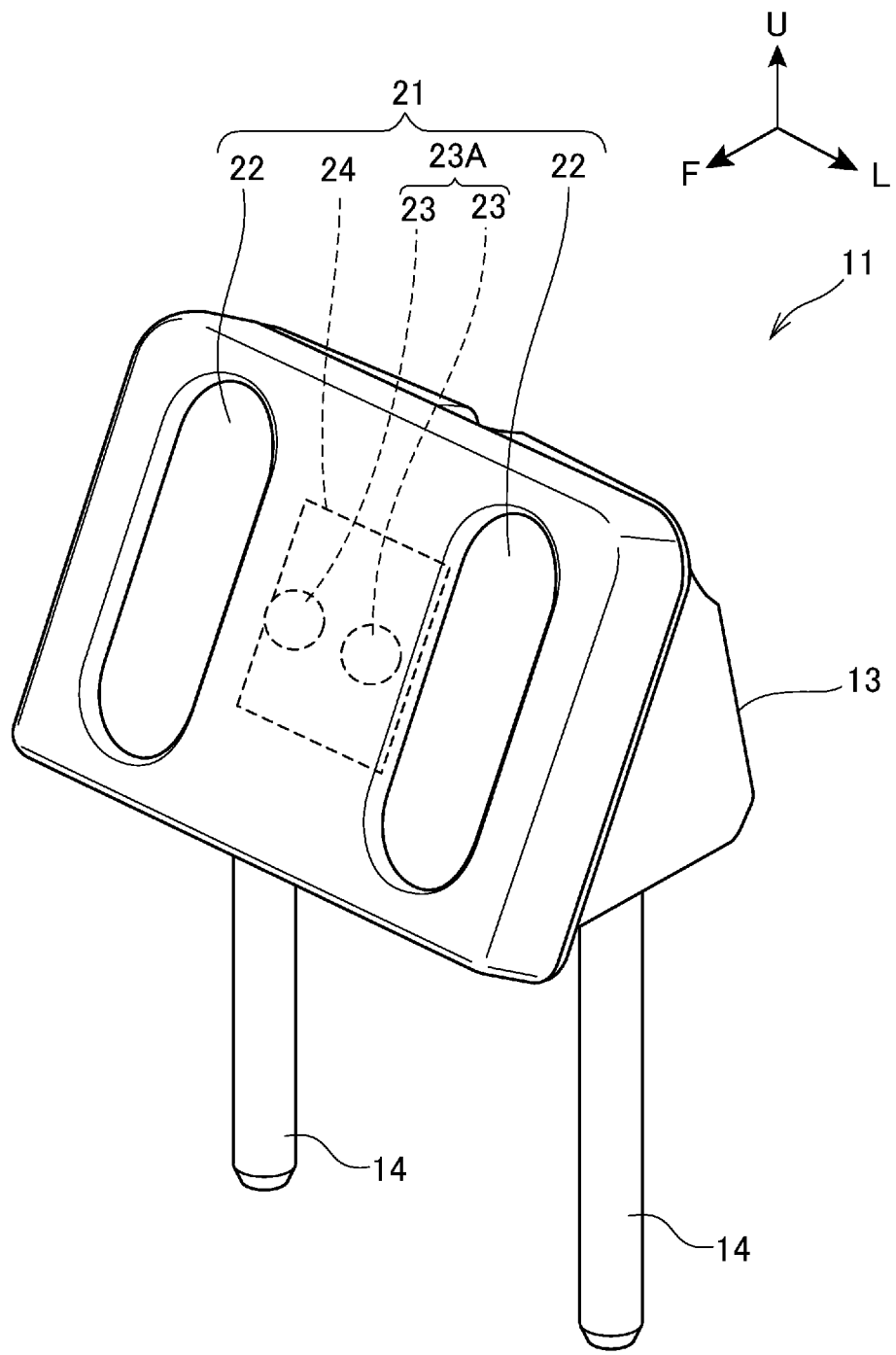
FIG. 2 is a perspective view of the headrest device.
Figure 3:
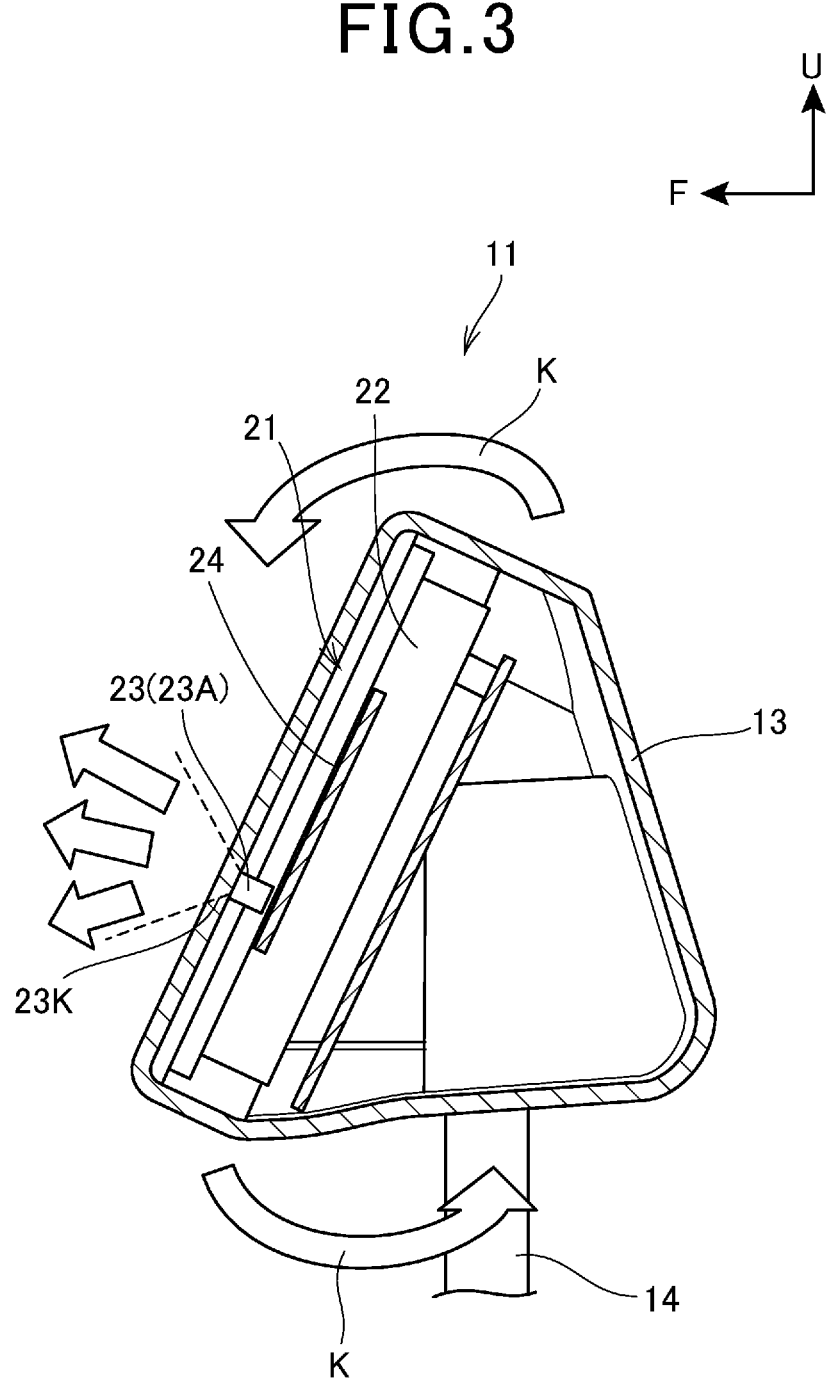
FIG. 3 is a lateral cross-sectional view of the headrest device.

FIG. 1 is a drawing illustrating an example of usage of a headrest device 11 according to a first embodiment. FIG. 2 is a perspective view of the headrest device 11. FIG. 3 is a lateral cross-sectional view of the headrest device 11. In these drawings, to indicate directions while using an occupant of the vehicle (hereinafter, simply "occupant") M as a reference, the forward direction is indicated with the letter "F", the upper direction is indicated with the letter "U", and the left direction is indicated with the letter "L".

As illustrated in FIG. 1, the headrest device 11 is installed on an occupant seat 12 provided in a vehicle (which is an automobile in the present embodiment). The headrest device 11 functions as a headrest positioned behind the head MH of the occupant (a driver in the present embodiment) M seated in the occupant seat 12. The headrest device 11 is applicable not only to automobiles, but also to other various vehicles such as airplanes, watercraft, and trains. Further, the headrest device 11 is applicable not only to vehicles, but also to furniture used in offices and residences such as office chairs and sofas. In other words, the headrest device 11 is widely applicable to any device having a headrest.

The headrest device 11 includes: a casing 13 that is hollow and forms the exterior shape of the headrest device 11; and a pair of left and right headrest stays 14 extending downward from the casing 13.

The casing 13 has housed therein a cushion member (not illustrated) to alleviate shock and an audio input/output unit 21. The audio input/output unit 21 includes a pair of left and right speakers 22, a plurality of microphones (hereinafter "the microphones") 23, and a circuit substrate 24. Under control of the circuit substrate 24, the audio input/output unit 21 outputs audio via the speakers 22 and receives an input of external audio (collects sound) via the microphones 23. Accordingly, the headrest device 11 is provided with an audio input/output function.

As illustrated in FIGS. 2 and 3, the audio input/output unit 21 is formed to have a thin shape of which the dimension in the front-and-back direction is small. The audio input/output unit 21 is housed in a space on the front side of the casing 13. Because the audio input/output unit 21 has a compact shape that is thin in the front-and-back direction, it is possible to easily have the audio input/output unit 21 housed in a headrest having any of various shapes (i.e., the casing 13 having any of various shapes).

Further, the casing 13 is movable in the up-and-down directions via the headrest stays 14 and is tiltable in the front-and-back directions relative to the headrest stays 14 (the tilting directions are indicated with the arrows K in FIG. 3). With these arrangements, it is possible to appropriately adjust the position of the casing 13 so as to fit the position of the head MH of the occupant M.

The pair of left and right speakers 22 are disposed on a front plate part 13A of the casing 13 while being positioned at an interval in the left-and-right direction and are configured to output sound toward the front. The speakers 22 are each configured with an oblong speaker extending in the up-and-down direction. With this arrangement, even when the position of the head MH of the occupant M moves in the up-and-down directions, it is possible to output audio toward the head MH of the occupant M. Further, also by moving the headrest device 11 in the up-and-down directions, it is possible to output audio toward the head MH of the occupant M, even when the position of the head MH varies depending on the physique of the occupant M.

Further, the plurality of microphones 23 are disposed between the left and the right speakers 22 and are provided so as to be able to collect sound at least from the front of the headrest. The circuit substrate 24 is disposed in a position that is behind the microphones 23 and between the left and the right speakers 22. In this manner, the microphones 23, the circuit substrate 24, and the speakers 22 are arranged in a compact manner, so as to keep the entire structure small.

Although the microphones 23 are attached to the circuit substrate 24 in the present embodiment, another arrangement is also acceptable in which the microphones 23 are positioned apart from the circuit substrate 24.

Further, because the audio input/output unit 21 is housed in the space on the front side of the casing 13, it is possible to maintain the layout in which the speakers 22 and the microphones 23 are facing forward, even when the angle of the casing 13 is changed.

Figure 4:
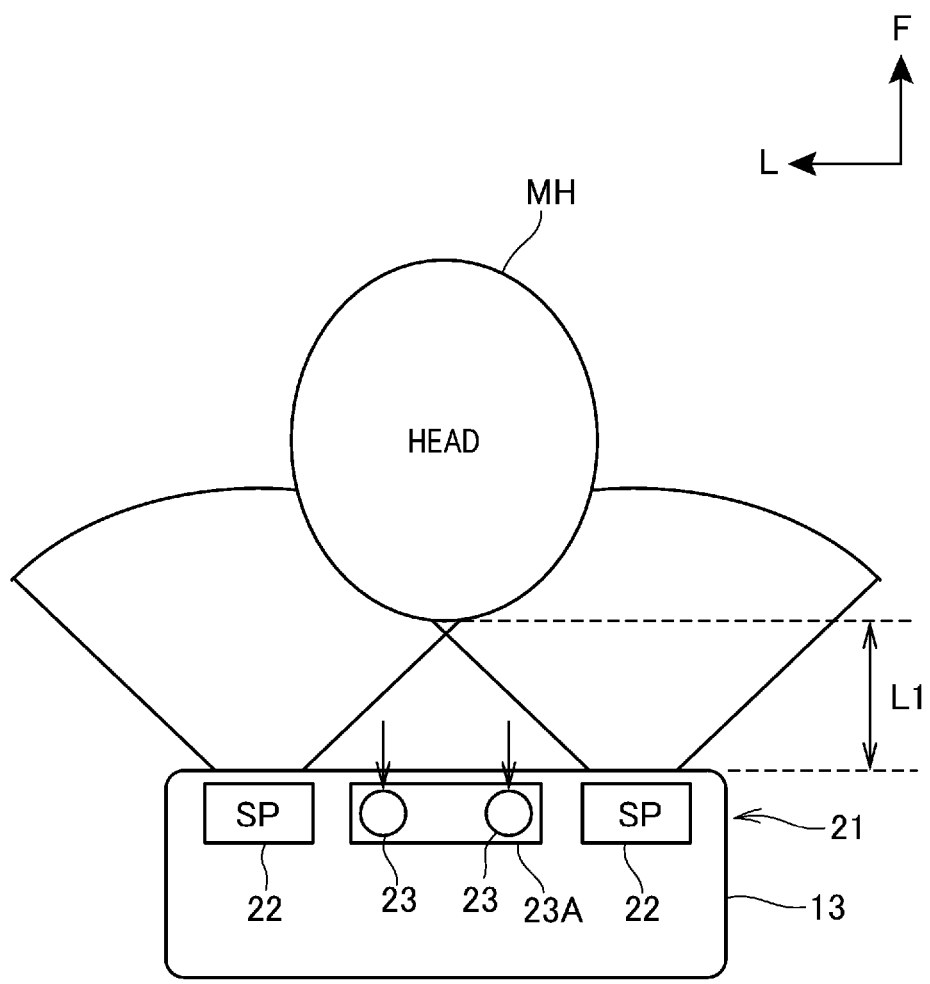
FIG. 4 is a view from above of the headrest device, together with the head of an occupant of the vehicle.

FIG. 4 is a view from above of the headrest device 11, together with the head MH of the occupant M.

As illustrated in FIG. 4, because the head MH of the occupant M is positioned in front of the casing 13 of the headrest device 11, it is possible to efficiently output the sound from the pair of left and right speakers 22 toward the left and the right ears of the occupant M.

The plurality of (two in the present configuration) microphones 23 are disposed at an equal height while being positioned at an interval in the left-and-right direction and are each configured to collect sound coming from the front of the headrest. The microphones 23 themselves are configured with non-directional microphones so as to be able to collect sound coming from a wide range in the surroundings thereof including voice of the occupant M.

When the occupant M speaks, audio from the vocal cord comes out rearward through the skin in an area extending from the back of the head to the neck (the spine) of the occupant M. Accordingly, by collecting this audio, it is possible to properly collect the voice of the occupant M. Further, in the present embodiment, because the microphones 23 are disposed while being positioned at an interval in the left-and-right direction, it is possible to collect, particularly, sound from the left and sound from the right in mutually-different phases, which makes it possible to easily distinguish between the sound from the left and the sound from the right.

As illustrated in FIG. 3, an opening part (a microphone opening part) 23K provided at the front of the microphones 23 is formed so that the opening has a cone shape of which the diameter becomes larger toward the front, so that no impact is made, even when the installation angle of the audio input/output unit 21 or the angle adjustment position of the headrest is varied. With this arrangement, regardless of the layout of the audio input/output unit 21 and the adjustment angle of the headrest, it is possible to easily collect the audio of the occupant M emitted rearward from the area between the back of the head and the neck of the occupant M or the like. It is therefore possible to apply the configuration to any of various models of vehicles.

As illustrated in FIG. 4, the left and the right end parts of the headrest device 11 is arranged to have a sound blocking structure that allows no sound to pass. With this arrangement, any audio leaking rearward from the left and the right speakers 22 or the like is blocked. It is therefore possible to inhibit impacts made on the sound entering the microphones 23. To the sound blocking structure, it is possible to apply any publicly-known sound blocking structure such as one configured with a sound absorber positioned behind the speakers 22.

Figure 5:
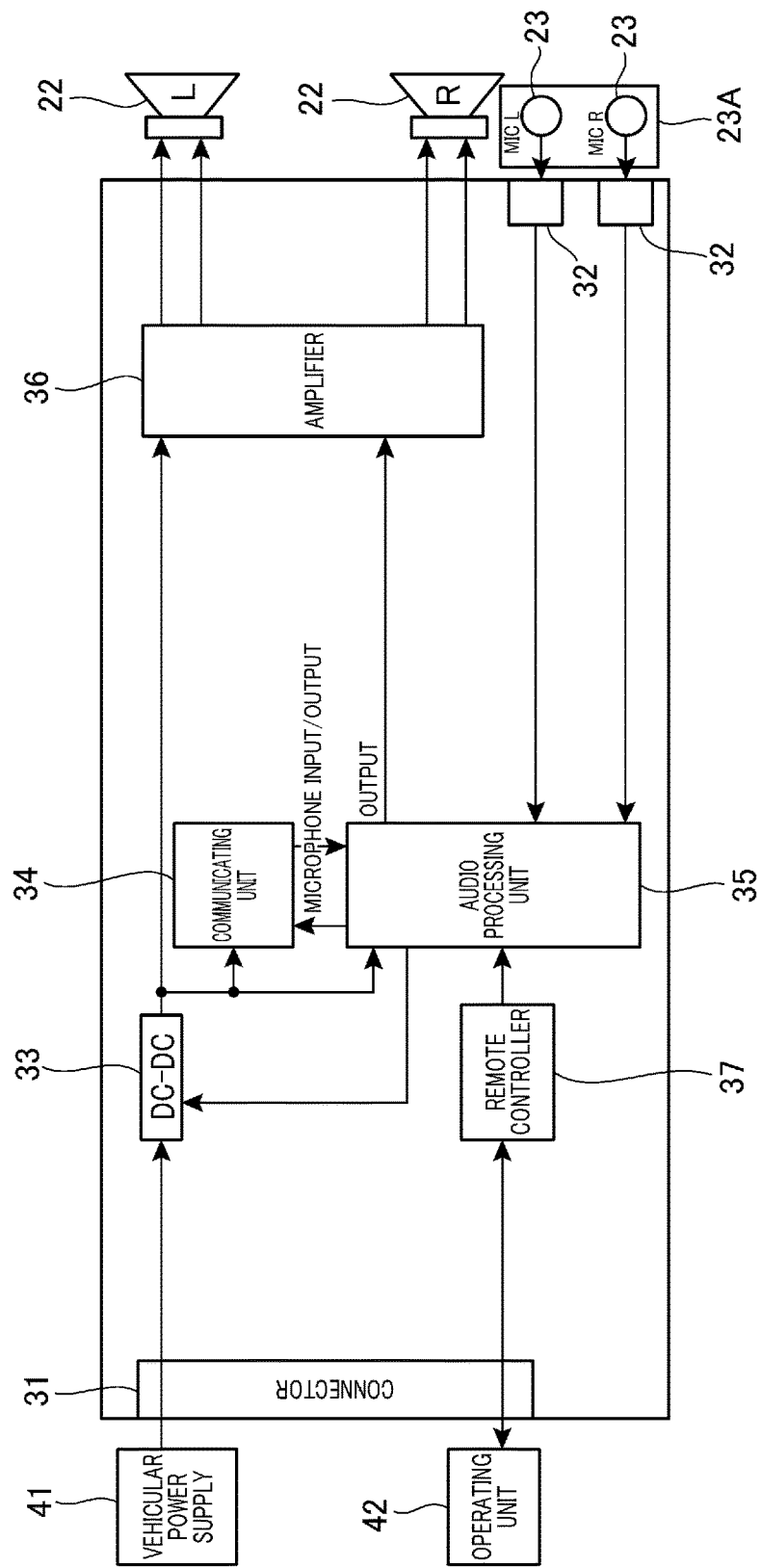
FIG. 5 is a block diagram illustrating an electric configuration of an audio input/output unit.

FIG. 5 is a block diagram illustrating an electric configuration of the audio input/output unit 21.

The circuit substrate 24 is configured by having installed thereon connectors 31 and 32, a DC-DC converter 33, a communicating unit 34, an audio processing unit 35, an amplifier 36, and a remote controller 37.

The connector 31 receives a supply from a vehicular power supply 41 and also receives an operation signal from an operating unit 42 operated by the occupant M. Further, the other connector 32 has the microphones 23 connected thereto. The DC-DC converter 33 converts the electric power supplied from the vehicular power supply 41 into a prescribed direct-current electric power and supplies the direct-current electric power to each of the elements structuring the audio input/output unit 21.

The communicating unit 34 functions as a communicating device that communicates with another device (not illustrated). In the present embodiment, the communicating unit 34 performs near-field wireless communication compliant with a communication standard such as Bluetooth (registered trademark). The communicating unit 34 outputs a reception result to the audio processing unit 35, and also, transmits microphone audio received as an input via the audio processing unit 35 to another device. The communication does not necessarily have to be wireless communication and may be wired communication.

Examples of "another device" include a mobile phone (which may be a smartphone), a tablet terminal, car audio equipment, and a car navigation device.

The audio processing unit 35 is configured with an acoustic Digital Signal Processor (DSP) including a microphone amplifier. By executing a control program stored in advance, the audio processing unit 35 functions as a judging unit that judges a current operation state (e.g., an operation mode), a controlling unit that controls the elements structuring the audio input/output unit 21, an arithmetic processing unit that performs various types of arithmetic processes, an audio amplifying unit that amplifies the input audio from the microphones 23, and the like. As explained below, the audio processing unit 35 and the communicating unit 34 realize a collaboration process between other devices and the audio input/output unit 21.

The arithmetic processes performed by the audio processing unit 35 include a beam forming control (arithmetic) process performed on a microphone input, playback output control (including an arithmetic process to thin out the output of the speakers) performed in accordance with noise level of a microphone input, outputting a test tone in a head position measuring mode, a distance calculating process based on a microphone input, and a voice recognition process performed on microphone audio.

The beam forming control process is a process to control directionality of a microphone array 23A including the plurality of microphones 23. More specifically, on the basis of a notion that propagations of sound waves from a sound source to the microphones 23 vary, the sound coming from a specific direction is either enhanced or reduced. For example, a plurality of directionality patterns are prepared so that, by switching between the patterns or by changing parameters of the patterns, the directionality pattern is switched into one suitable for collecting the audio of the occupant M with a high level of precision or into one suitable for collecting audio in the surroundings (e.g., noise) with a high level of precision.

The playback output control exercised in accordance with the noise level of a microphone input is a process of controlling either the sound volume or the frequency so as to reduce the impacts made by ambient noise. In the following sections, when the microphones 23 do not particularly need to be distinguished from each other, the microphones 23 will be referred to as the microphone array 23A.

The head position measuring mode is a mode in which a test signal is output from the speakers 22 and the position of the head MH of the occupant M is measured on the basis of a reflected sound collected by the microphone array 23A. In the head position measuring mode, a position identifying process is performed to calculate a space-apart distance L1 (see FIG. 4) between the head MH of the occupant M and the microphone array 23A. The space-apart distance L1 is used when the directionality of the microphone array 23A is controlled toward to the head MH, by performing the beam forming control process.

Any of publicly-known processes is widely applicable to these processes. Accordingly, it is possible to inhibit degradation of the quality of the audio collected from the occupant M and degradation of the percentage of voice recognition that may be caused by the position of the seat, the physique of the occupant M, the space-apart distance L1 from the microphone array 23A, and/or the like.

As an alternative, if another configuration were used in which the position of the ear or the head is identified by using a sensor for the purpose of improving the level of precision of the directionality or the like, the system would become extremely complicated, and the cost would significantly increase. Further, if the microphone array 23A were installed by positioning an arm or the like around the face of the occupant M in consideration of the possibility of the occupant M moving his/her face around, the microphone array 23A might become impeditive for the occupant M, and it would also be necessary to consider the impacts that may be made when an airbag is activated.

In contrast, in the present embodiment, voice of the occupant M is collected by disposing the microphone array 23A behind the head MH of the occupant M and controlling the directionality of the microphone array 23A. With this arrangement, it is possible to realize voice recognition processes and hands-free conversations without preventing the occupant M from moving his/her face around, while keeping the number of component parts small and preventing the structure from becoming complicated.

Under control of the audio processing unit 35, the amplifier 36 drives the speakers 22 on the basis of the audio data obtained via the communicating unit 34, so that the speakers 22 output audio corresponding to the audio data. By using a digital amplifier as the amplifier 36, it is possible to keep the amplifier 36 compact, and the like.

The remote controller 37 controls operations of the audio processing unit 35 on the basis of an operation signal from the operating unit 42. The operating unit 42 receives an operation performed by the occupant M and to switch between the operations modes and the like of the audio input/output unit 21.

Example of the operation modes (operation states) include: the head position measuring mode in which the position of the head MH of the occupant M (the space-apart distance L1 illustrated in FIG. 4) is measured; the audio playback mode in which the audio (music, navigation audio, or the like) sent thereto from another device is played back; a speech mode in which speech audio of the occupant M is recognized; and a conversation mode in which a hands-free conversation using a mobile phone is realized.

Next, the above operations of the audio input/output unit 21 will be explained.

Figure 6:
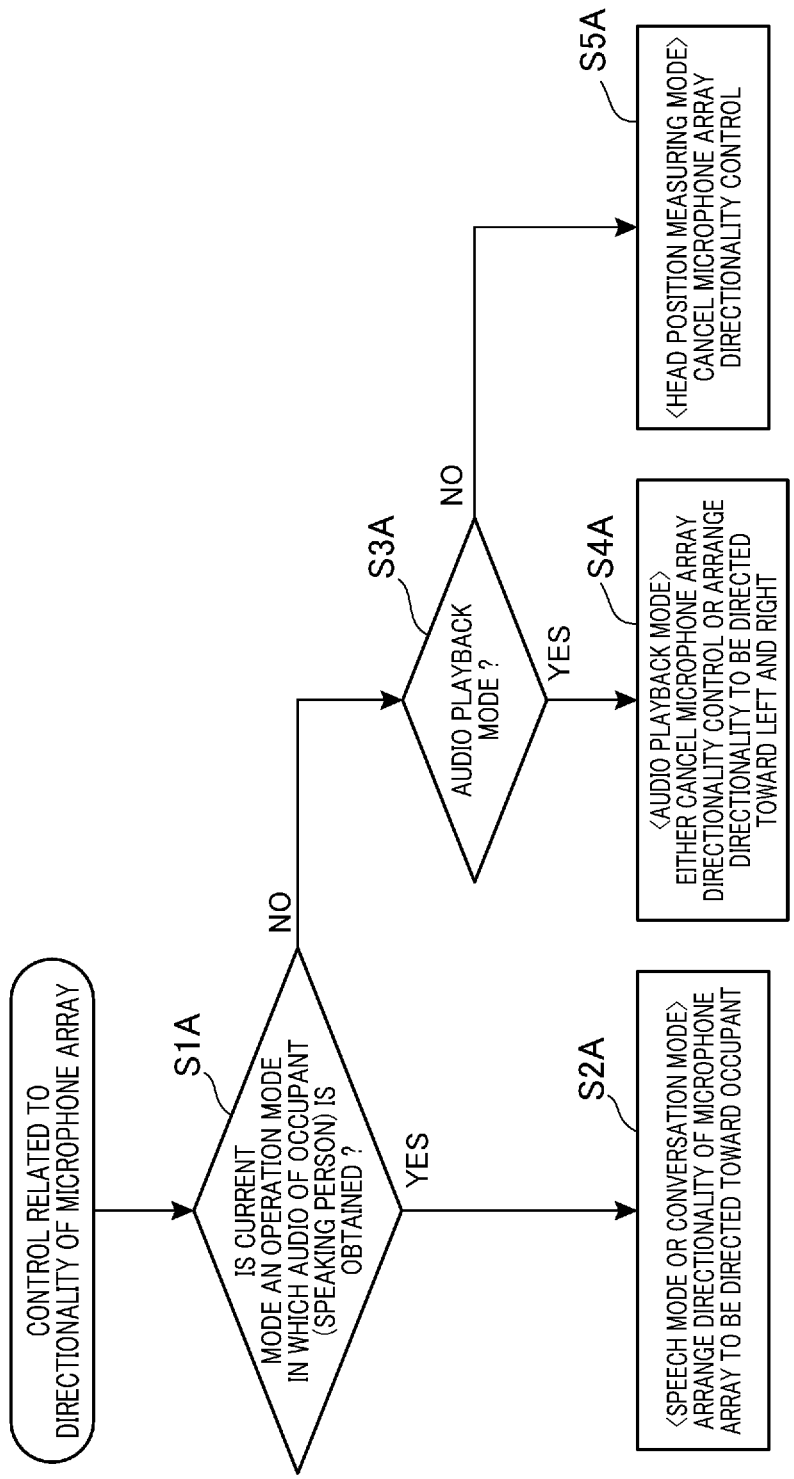
FIG. 6 is a flowchart illustrating control related to directionality of a microphone array.

FIG. 6 is a flowchart illustrating the control related to the directionality of the microphone array 23A.

As illustrated in the drawing, in the audio input/output unit 21, the audio processing unit 35 judges whether or not the current mode is a predetermined operation mode in which audio of the occupant (the speaking person) M is obtained (step S1A). Control is exercised so as to change the directionality (the directionality pattern) of the microphone array 23A in accordance with the judgment result (steps S2A, S4A, and S5A).

More specifically, when the current mode is an operation mode (the speech mode or the conversation mode) in which audio of the occupant M is obtained (step S1A: Yes), the audio processing unit 35 arranges the directionality of the microphone array 23A to be directed toward the occupant M (step S2A). On the contrary, when the current mode is not the abovementioned operation mode (step S1A: No), the audio processing unit 35 judges whether or not the current mode is the audio playback mode (step S3A). When the current mode is the audio playback mode (step S3A: Yes), the audio processing unit 35 either cancels the directionality control exercised over the microphone array 23A or arranges the directionality of the microphone array 23A to be directed toward the left and the right directions on the outside of the occupant M (step S4A). Whether the directionality control exercised over the microphone array 23A should be cancelled or the directionality should be directed toward the left and the right directions on the outside of the occupant M may be determined according to an initial setting designated by a user (e.g., the occupant M).

On the contrary, when the current mode is not the audio playback mode (step S3A: No), the audio processing unit 35 cancels the directionality control exercised over the microphone array 23A (step S5A). When the directionality control has been cancelled, the directionality is non-directional.

Next, control related to the speakers 22 and the microphone array 23A exercised in each of the operation modes will be explained.

Figure 7:
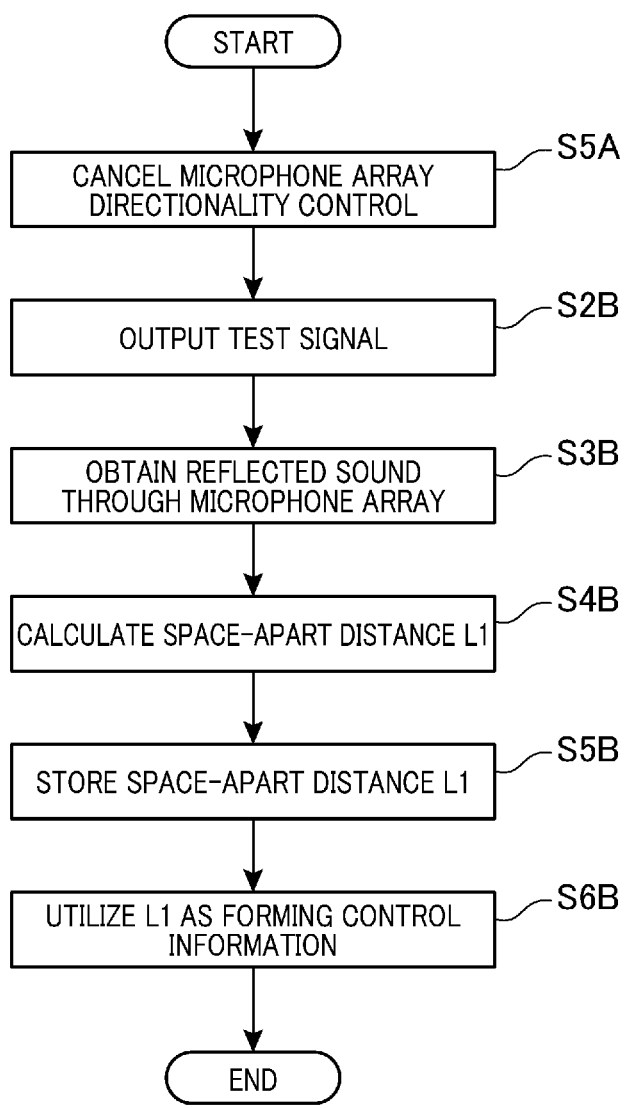
FIG. 7 is a flowchart illustrating control exercised during a head position measuring mode.

FIG. 7 is a flowchart illustrating control (a position identifying process) exercised during the head position measuring mode.

In the head position measuring mode, the audio processing unit 35 cancels the directionality control exercised over the microphone array 23A (step S5A) and subsequently causes a test signal (e.g., a test tone) to be output from the speakers 22 (step S2B) and obtains a reflected sound of the test signal through the microphone array 23A (step S3B).

In this situation, the sound output from the speakers 22 is reflected by the head MH of the occupant M and collected by the microphone array 23A. More specifically, the sound of the test signal reflected in a certain position in the area extending from the back of the head to the neck of the occupant M and the like are collected by the microphone array 23A. By performing a process of identifying the reflected sound from within the input audio of the microphones 23, the audio processing unit 35 obtains the reflected sound of the test signal.

Next, on the basis of a delay period of the reflected sound (the time period between when the test signal is output and when the reflected sound is collected by the microphones 23), the audio processing unit 35 calculates the distance to the location in which the sound output from the speakers 22 is reflected, i.e., the space-apart distance L1 indicating the distance to the area extending from the back of the head to the neck of the occupant M (step S4B). After that, the audio processing unit 35 stores information about the calculated space-apart distance L1 into a memory (not illustrated) (step S5B) and utilizes the information about the space-apart distance L1 as forming control information used for setting the directionality in the beam forming control process (step S6B).

In other words, when controlling the directionality of the microphone array 23A, the audio processing unit 35 sets the directionality of the microphone array 23A to make it possible to efficiently collect the sound coming from the area extending from the back of the head to the neck of the occupant M, on the basis of the space-apart distance L1. To set the directionality, it is possible to use any of publicly-known controlling processes, such as a process of selecting an optimal directionality pattern from among a plurality of directionality patterns.

As additional information, the head position measuring mode described above is implemented, before the current mode transitions into an operation mode (e.g., the speech mode or the conversation mode) in which the directionality of the microphone array 23A is controlled. For example, the head position measuring mode may be implemented while a telephone call is being made or while an incoming-call ringtone is ringing, before the device goes into the conversation state.

Figure 8:
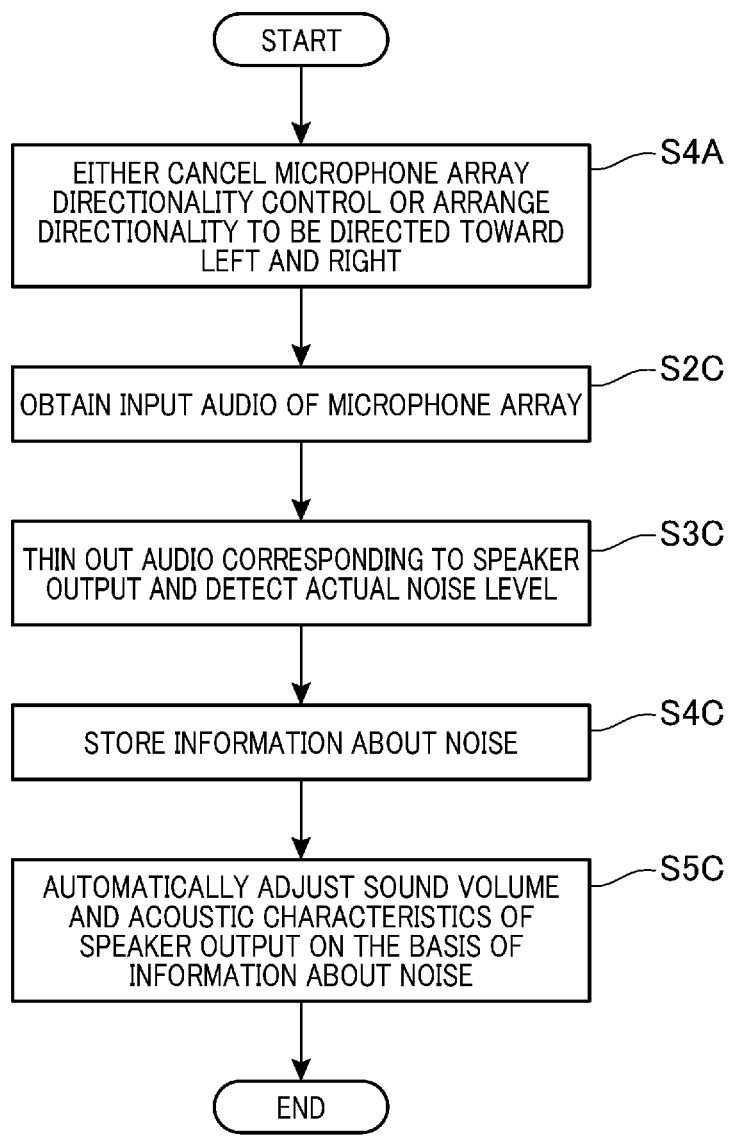
FIG. 8 is a flowchart illustrating control exercised during an audio playback mode.

FIG. 8 is a flowchart illustrating control exercised during the audio playback mode.

The audio playback mode is an operation mode in which audio (e.g., music, navigation audio, or the like) sent thereto from another device is played back. Accordingly, the corresponding audio is output from the speakers 22.

When the current mode is the audio playback mode, the audio processing unit 35 obtains the input audio of the microphone array 23A (step S2C) by either cancelling the directionality control exercised over the microphone array 23A or arranging the directionality of the microphone array 23A to be directed toward the left and the right directions on the outside of the occupant M (step S4A).

The input audio is audio including the ambient noise and the audio output from the speakers (including the reflected sound). The audio processing unit 35 extracts the ambient noise by performing an arithmetic process to thin out the audio corresponding to the speaker output from the obtained audio and detects average sound pressure of the noise level as an actual noise level (step S3C).

The audio processing unit 35 stores information about the detected noise (the noise level in the present embodiment) into a memory (not illustrated) (step S4C) and automatically adjusts the sound volume and the acoustic characteristics of the speaker output on the basis of the information about the noise (step S5C).

To describe the automatic adjusting process in detail, for example, when the noise level has changed by an amount equal to or larger than a threshold value determined in advance, the volume level is gradually adjusted on a certain slope. Alternatively, the control may be exercised in a simpler manner such as to increase the sound volume when the noise level is higher and to decrease the sound volume when the noise level becomes lower. Further, to control the acoustic characteristics, equalizing control may be exercised so that, when the noise level is higher, lower and higher ranges are enhanced so as to become more audible.

By repeatedly performing the processes at steps S2C through S5C as appropriate, it is possible to detect the level of the ambient noise with an excellent level of precision during the audio playback mode. It is also possible to make it easier for the occupant M and others to hear the audio by playing back the audio in accordance with the ambient noise.

As for the information about the noise, instead of storing only the noise level, other information such as information about the frequency of the noise may be stored. In that situation, it is desirable to inhibit impacts of the noise by making use of the frequency of the noise in the sound volume control and the acoustic characteristic control.

Figure 9:
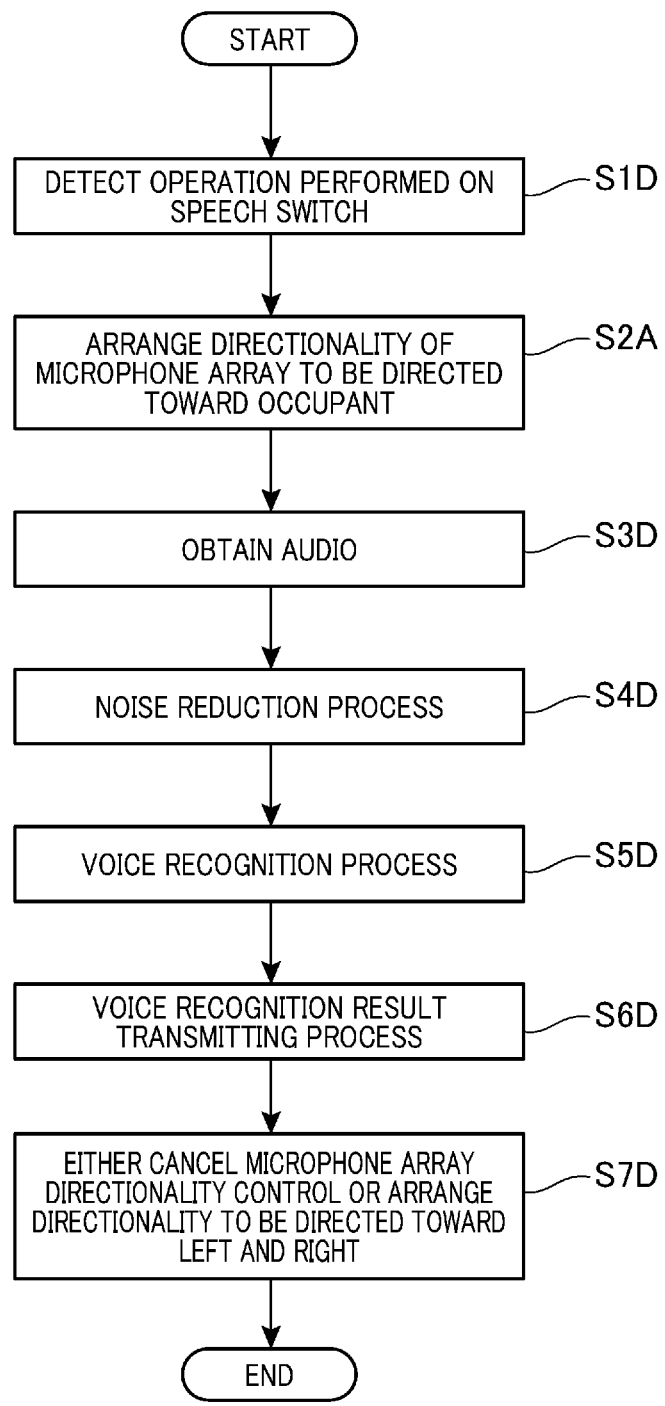
FIG. 9 is a flowchart illustrating control exercised during a speech mode.

FIG. 9 is a flowchart illustrating control exercised during the speech mode.

As a premise, the audio processing unit 35 transitions into the speech mode, when having detected that the occupant M or the like has operated a speech switch which instructs that a voice recognition process (or an audio operation) should be started.

As illustrated in FIG. 9, when having detected that the speech switch has been operated (step S1D), the audio processing unit 35 arranges the directionality of the microphone array 23A to be directed toward the occupant M (toward a certain position in the area extending from the back of the head to the neck), on the basis of the space-apart distance L1 obtained in the head position measuring mode (step S2A). Subsequently, the audio processing unit 35 obtains input audio of the microphone array 23A and obtains the audio from the occupant M by performing the beam forming control process (step S3D).

The audio obtained in this manner is audio data that certainly contains the audio of the occupant M, because the directionality of the microphone array 23A is directed toward the occupant M. There is, however, also a high possibility that the obtained audio may contain the ambient noise such as the sound of the engine. When the ambient noise has a large impact, it may not be possible to perform the voice recognition process with a high level of precision.

To cope with this situation, the audio processing unit 35 performs a noise reduction process to eliminate the ambient noise from the obtained audio (the audio data) on the basis of the information about the ambient noise obtained during the audio playback mode (step S4D) and subsequently performs the voice recognition process (step S5D).

In this manner, because the voice recognition process is performed while the directionality of the microphone array 23A is directed toward the occupant M and after the ambient noise is eliminated, it is possible to obtain the voice of the occupant M with a high level of precision and to perform the voice recognition process with a high level of precision. After the voice recognition process, the audio processing unit 35 transmits a result of the voice recognition process to another device via the communicating unit 34 (step S6D). Accordingly, it is possible to perform an audio operation or the like on the other device, on the basis of the audio of the occupant M.

After that, the audio processing unit 35 either cancels the directionality control exercised over the microphone array 23A or arranges the directionality of the microphone array 23A to be directed toward the left and the right directions on the outside of the occupant M (step S7D).

Even in the speech mode, the audio processing unit 35 performs, after step S7D, the process of detecting and storing the ambient noise as described at steps S3C and S3D above. As a result, it is possible to efficiently obtain the information about the ambient noise, by making use of the time period when the audio of the occupant M is not being obtained. With this arrangement, it is possible to update the information about the noise stored in the memory with the most up-to-date information. The control related to the speakers 22 and the microphone array 23A in the speech mode has thus been explained.

FIG. 10 is a flowchart illustrating control exercised during the conversation mode.

As a premise, the audio processing unit 35 transitions into the conversation mode, when having detected that a mobile phone communicably connected via Bluetooth or the like has gone into a conversation state (telephone-call making or receiving state).

As illustrated in FIG. 10, when having detected that the mobile phone has gone into a conversation state (step S1E), the audio processing unit 35 arranges the directionality of the microphone array 23A to be directed toward the occupant M (toward a certain position in the area extending from the back of the head to the neck), on the basis of the stored space-apart distance L1 (step S2E). The process at step S2E is the same as the process at step S2A explained above.

Subsequently, the audio processing unit 35 obtains the input audio of the microphone array 23A and efficiently obtains the audio from the occupant M by exercising the beam forming control (step S3E). Similarly, the process at step S3E is the same as the process at step S3D explained above.

In the conversation mode, under the control of the audio processing unit 35, a process of obtaining audio from the other party of the phone conversation via the communicating unit 34 and outputting the obtained audio through the speakers 22 is also performed in parallel.

After the process at step S3E, the audio processing unit 35 performs an echo cancelling process and a noise reduction process (step S4E). The echo cancelling process is a process to erase echoes occurring due to the microphone array 23A collecting the sound played back through the speakers 22. For this process, it is possible to use any of publicly-known processes.

The noise reduction process is a process to eliminate the ambient noise from the obtained audio (the audio data) on the basis of the stored information about the ambient noise and is the same as the process at step S4D explained above. As a result, it is possible to obtain the audio of the occupant M while the ambient noise is eliminated.

After that, the audio processing unit 35 transmits the audio data resulting from the echo cancelling process and the noise reduction process, to the mobile phone via the communicating unit 34 (step S5E). As a result, it is possible to send the audio of the occupant M which are free of echoes and from which the noise has been eliminated, to the other party of the phone conversation.

After that, when having detected that the conversation state of the mobile phone that was communicably connected via Bluetooth or the like is cancelled (step S6E), the audio processing unit 35 either cancels the directionality control exercised over the microphone array 23A or arranges the directionality of the microphone array 23A to be directed toward the left and the right directions on the outside of the occupant M (step S7E).

In this situation, even in the conversation mode, in the same manner as in the speech mode, the audio processing unit 35 performs the process of detecting and storing the ambient noise as described at steps S3C and S3D above, after performing the process at step S7E where the directionality of the microphone array 23A was directed toward the outside of the occupant M. As a result, it is possible to efficiently obtain the information about the ambient noise, by making use of the time period when the audio of the occupant M is not being obtained. With this arrangement, it is possible to update the information about the noise stored in the memory with the most up-to-date information. The control related to the speakers 22 and the microphone array 23A in the conversation mode has thus been explained.

As explained above, the headrest device 11 according to the present embodiment functions as a judging unit that judges whether or not the current mode is the operation mode (the speech mode or the conversation mode) in which the audio of the occupant M is obtained, which serves as a state (hereinafter, "the first state") in which the audio processing unit 35 obtains the audio of the occupant M who is the speaking person (see step S1A in FIG. 6) and functions as the controlling unit that obtains the input audio of the microphone array 23A by setting the directionality of the microphone array 23A either to be directed toward the outside of the occupant M or to be non-directional, when the current mode is one of the other operation modes (the audio playback mode or the head position measuring mode) which serves as a second state different from the first state, and that arranges the directionality of the microphone array 23A to be directed toward the occupant M when the current mode is an operation mode in the first state.

With these arrangements, it is possible to obtain the ambient noise and the position information of the occupant M, which are both useful information for the audio processing processes performed during speech, on the basis of the input audio obtained by setting the directionality of the microphone array 23A to be directed toward the outside of the occupant M or to be non-directional. By using the obtained information, it is possible to perform the audio processing processes such as the ambient noise eliminating process or the directionality controlling process during the speech. As a result, a dedicated position detector is not required. Accordingly, it is possible to easily obtain the audio of the occupant M with a higher level of precision, while keeping the number of component parts small and preventing the structure from becoming complicated.

In addition, the microphone array 23A is disposed behind the occupant M serving as the speaking person. The audio processing unit 35 sets the directionality of the microphone array 23A to be in the area extending from the back of the head to the neck of the occupant M, when the current mode is an operation mode in the first state (the speech mode or the conversation mode). Consequently, it is possible to efficiently obtain the audio of the occupant M in the position behind the occupant M.

Further, the audio processing unit 35 obtains the ambient noise on the basis of the input audio obtained in the operation mode in the second state (the audio playback mode) (see FIG. 8). When the current mode is an operation mode in the first state (the speech mode or the conversation mode), the audio processing unit 35 performs the noise reduction process (the noise eliminating process) to eliminate the ambient noise from the input audio of the microphone array 23A. Consequently, the ambient noise is easily obtained with a high level of precision and with ease. It is therefore possible to easily eliminate the noise to a sufficient level.

Further, the audio processing unit 35 and the amplifier 36 function as an audio output unit that outputs audio via the speakers 22. Even when the current mode is the speech mode in which the audio of the occupant M is obtained or the conversation mode in which audio is output via the speakers 22, and also, audio of the occupant M is obtained, the input audio of the microphone array 23A is obtained by setting the directionality of the microphone array 23A to be directed toward the outside of the occupant M or to be non-directional, during the time period (corresponding to the second state) when the audio of the occupant M is not being obtained (step S7D in FIG. 9, step S7E in FIG. 10, and the like), so as to detect and store the ambient noise. With these arrangements, even the current mode is an operation mode in which the audio of the occupant M is obtained, it is possible to obtain the ambient noise. It is therefore possible to easily obtain the most up-to-date ambient noise.

Further, even when the current mode is the head position measuring mode (corresponding to the second state) in which the position of the occupant M is identified by using the speakers 22 and the microphone array 23A, the input audio of the microphone array 23A is obtained by setting the microphone array 23A to be non-directional. Consequently, by obtaining the reflected sound that was reflected by the occupant M, it is possible to obtain the position information of the occupant M with an excellent level of precision. By using the position information obtained in this manner, it is possible to control the directionality of the microphone array 23A so as to make it possible to obtain the audio of the occupant M with a high level of precision.

Further, because the microphone array 23A and the speakers 22 are disposed in the casing 13 positioned behind the occupant M, there is no need to provide a dedicated position detector or the like. It is therefore possible to provide a compact device that has an excellent sound collecting capability and an audio output function.

In addition, because the casing 13 is a headrest, it is possible to arrange the microphone array 23A and the speakers 22 while using the space in an existing headrest.

Second Embodiment

The headrest device 11 according to a second embodiment performs, when the current mode is an operation mode (the audio output mode) in which audio is output via the speakers 22, a position identifying process, under the control of the audio processing unit 35, of outputting an ultrasound wave signal through the speakers 22 as a test signal, obtaining a reflected sound of the test signal via the microphone array 23A, and identifying the position of the occupant M on the basis of the reflected sound. The configurations other than performing the position identifying process are the same as the configurations in the first embodiment.

The audio output mode mentioned above may be, for example, the audio playback mode in which audio (music, navigation audio, or the like) sent thereto from another device is played back and the conversation mode, or may be one of the audio playback and the conversation modes.

Because the ultrasound wave signal is outside of an audible range, the ultrasound wave signal is not recognized by the occupant M. The ultrasound wave signal also has sharp directionality, and the reflected sound thereof is easy to measure accurately. As a result, it is possible to identify the position of the occupant M with an excellent level of precision while playing back music or enabling the occupant M to have a hands-free conversation. In addition, this configuration does not make the occupant M uncomfortable. Consequently, in addition to the various advantageous effects of the first embodiment, it is possible to obtain the position of the occupant M with a high level of precision, while outputting the audio to be heard by the occupant M.

Furthermore, it is possible to identify the position of the occupant M with arbitrary timing. It is therefore possible to easily obtain the most up-to-date information. Consequently, it is possible to exercise the directionality control over the speakers 22 on the basis of the position of the occupant M with an excellent level of precision.

For the ultrasound wave signal, it is acceptable to use any ultrasound wave band in which the speakers 22 are able to make an output. However, because some of the recent music may include a sound outside the audible range, it is desirable to use a frequency on the outside of frequency bands used in music. Further, because it is possible to perform the position identifying process in place of the head position measuring mode in the first embodiment, the head position measuring mode may be omitted.

The embodiments described above merely illustrate certain modes of the embodiments of the present invention. It is therefore possible to arbitrarily apply a modification thereto or implement a practical application therewith, without departing from the scope of the present invention.

For example, the number of microphones 23 included in the microphone array 23A does not necessarily have to be two. Further, the speakers 22 may have a low- or high-range speaker added thereto.

Further, although the examples were explained in which the present invention is applied to the headrest device 11 functioning as a headrest and to the method of controlling the same, it is possible to widely apply the present invention not only to a device functioning as a headrest, but also to a sound collecting device capable of controlling the directionality of the microphone array 23A structured by arranging the plurality of microphones 23 and to a method of controlling the same.

Further, in the embodiments described above, the example was explained in which the control program used for exercising the control is stored in the headrest device 11 in advance; however, possible embodiments are not limited to this example. It is also acceptable to store the control program into a computer-readable recording medium such as a magnetic recording medium, an optical recording medium, a semiconductor recording medium, or the like, so that a computer reads and executes the control program from the recording medium. Further, it is also acceptable to arrange the control program to be downloadable from a distribution server or the like via a communication network (a telecommunication line).

REFERENCE SIGNS LIST

11: headrest device (sound collecting device)
13: casing
21: audio input/output unit
22: speakers
23: microphones
23A: microphone array
34: communicating unit
35: audio processing unit (judging unit, controlling unit)
36: amplifier

The invention claimed is:
1. A sound collecting device comprising:
a microphone array structured by arranging a plurality of microphones; and
a CPU controlling directionality of the microphone array,
wherein the CPU, in predetermined operation modes, judges whether or not a current state is a first state in which audio of a speaking person is obtained,
when the current state is the first state, the CPU controls the directionality of the microphone array to be directed toward the speaking person,
when the current state is a second state different from the first state, input audio of the microphone array is obtained by the CPU setting the directionality of the microphone array to be directed away from the speaking person or to be non-directional,
the CPU is capable of outputting audio via a speaker, and
the CPU has, as the predetermined operation modes,
a speech mode in which audio of the speaking person is obtained and transmits information based on the obtained audio, and
a conversation mode in which audio is output via the speaker,
wherein the first state in the speech mode or the conversation mode is a state obtaining audio of the speaking person,
the second state includes
a state in which audio of the speaking person is not obtained and
includes a state after obtaining the audio of the speaking person and transmitting information based on the obtained audio in the speech mode; and a state in which audio of the speaking person is not obtained and
includes a state after detecting that a conversation state of a predetermined device is cancelled in the conversation mode.

2. The sound collecting device according to claim 1, wherein
the microphone array is positioned behind the speaking person, and
when the current state is the first state, the CPU sets the directionality of the microphone array to be directed toward the speaking person.

3. The sound collecting device according to claim 1, wherein
the CPU obtains ambient noise on a basis of the input audio obtained in the second state and performs, when the current state is the first state, a noise eliminating process to eliminate the ambient noise from input audio of the microphone array,
wherein the ambient noise is obtained on the basis of the input audio obtained in the second state.

4. The sound collecting device according to claim 1, wherein
the sound collecting device has, as another one of the operation modes, a position identifying mode in which a reflected sound that is a sound output from the speaker and is reflected by the speaking person is obtained and a position of the speaking person is identified on a basis of the reflected sound,
the second state includes a state of being in the position identifying mode, and
when the current state is the first state, the directionality of the microphone array is controlled in accordance with the position of the speaking person identified in the position identifying mode.

5. The sound collecting device according to claim 1, wherein
when a current mode is an audio output mode in which audio is output via the speaker, the CPU performs a position identifying process of outputting an ultrasound wave signal from the speaker, obtaining a reflected sound of the ultrasound wave signal, and identifying a position of the speaking person on the basis of the reflected sound.

6. The sound collecting device according to claim 1, wherein
the microphone array and the speaker are disposed in a casing positioned behind the speaking person.

7. The sound collecting device according to claim 6, wherein
the casing is a headrest.

8. A method of controlling a sound collecting device capable of controlling directionality of a microphone array structured by arranging a plurality of microphones, the method comprising the steps of:
judging, by a CPU, whether or not a current state is a first state in which audio of a speaking person is obtained in predetermined operation modes;
arranging, when the current state is the first state, the directionality of the microphone array to be directed toward the speaking person by the CPU; and
obtaining, when the current state is a second state different from the first state, input audio of the microphone array by the CPU setting the directionality of the microphone array to be directed away from the speaking person or to be non-directional,
wherein the predetermined operation modes in the step of judging include
a speech mode in which audio of the speaking person is obtained and transmits information based on the obtained audio, and
a conversation mode in which audio is output via a speaker,
wherein the first state in the speech mode or the conversation mode in the step of arranging is a state obtaining audio of the speaking person,
the second state in the step of obtaining includes
a state in which audio of the speaking person is not obtained and
includes a state after obtaining the audio of the speaking person and transmitting information based on the obtained audio in the speech mode; and
a state in which audio of the speaking person is not obtained and
includes a state after detecting that a conversation state of a predetermined device is cancelled in the conversation mode.

9. A sound collecting device comprising:
a microphone array structured by arranging a plurality of microphones;
a speaker outputting sound or audio of a speaking person; and
an audio processing circuit including a controlling circuit and a judging circuit,
wherein the controlling circuit controls directionality of the microphone array,
the judging circuit, in predetermined operation modes, judges whether or not a current state is a first state in which audio of the speaking person is obtained,
wherein when the current state is the first state, the controlling circuit controls the directionality of the microphone array to be directed toward the speaking person,
when the current state is a second state different from the first state, the controlling circuit obtains input audio of the microphone array by setting the directionality of the microphone array to be directed away from the speaking person or to be non-directional,
wherein the predetermined operation modes include
a speech mode in which audio of the speaking person is obtained and transmits information based on the obtained audio,
a conversation mode in which audio is output via the speaker, and
a position identifying mode in which a reflected sound that is a sound output from the speaker and is reflected by the speaking person is obtained and a position of the speaking person is identified on a basis of the reflected sound,
wherein the second state includes a state of being in the position identifying mode, and
when the current state is the first state, the directionality of the microphone array is controlled in accordance with the position of the speaking person identified in the position identifying mode.

10. The sound collecting device according to claim 9, wherein in the position identifying mode, a position identifying process is performed by outputting an ultrasound wave signal from the speaker, obtaining a reflected sound of the ultrasound wave signal, and identifying a position of the speaking person on the basis of the reflected sound.

11. The sound collecting device according to claim 9, wherein the microphone array and the speaker are disposed in a casing positioned behind the speaking person.

12. The sound collecting device according to claim 11, wherein the casing is a headrest.

* * * * *